（12） United States Patent
Winkler et al.

(10) Patent No.: US 11,237,041 B2
(45) Date of Patent: Feb. 1, 2022

(54) SYSTEMS AND METHODS FOR CONTROLLING A SCALE

(71) Applicant: Pelstar, LLC, McCook, IL (US)

(72) Inventors: Mark Winkler, McCook, IL (US); Ken Harris, McCook, IL (US)

(73) Assignee: Pelstar, LLC, McCook, IL (US)

( * ) Notice: Subject to any disclaimer, the term of this patent is extended or adjusted under 35 U.S.C. 154(b) by 0 days.

(21) Appl. No.: 16/794,903

(22) Filed: Feb. 19, 2020

(65) Prior Publication Data
US 2020/0264035 A1 Aug. 20, 2020

Related U.S. Application Data

(60) Provisional application No. 62/807,420, filed on Feb. 19, 2019.

(51) Int. Cl.
*G01G 23/36* (2006.01)
*G06F 3/01* (2006.01)
*G01G 23/16* (2006.01)
*G01G 23/01* (2006.01)
*G08B 7/06* (2006.01)

(52) U.S. Cl.
CPC ............ *G01G 23/36* (2013.01); *G01G 23/01* (2013.01); *G01G 23/16* (2013.01); *G06F 3/017* (2013.01); *G08B 7/06* (2013.01)

(58) Field of Classification Search
CPC ................................. G01G 19/44; G06F 3/017
USPC ........................................................ 340/6.11
See application file for complete search history.

(56) References Cited

U.S. PATENT DOCUMENTS

| 4,055,748 A | 10/1977 | Boshinski et al. |
| 2002/0195283 A1* | 12/2002 | Petrucelli ............... G01G 23/20 177/256 |
| 2009/0071731 A1 | 3/2009 | Gerster |

(Continued)

FOREIGN PATENT DOCUMENTS

EP 2565597 B1 7/2015

OTHER PUBLICATIONS

Scalesgalore.com "Ohaus NVL5101/1 (83033070) Navigator XL w Touchless Sensors Scale, 5100x0.5 g", 2011, total of 7 pages (Year: 2011).*

*Primary Examiner* — Fabricio R Murillo Garcia
(74) *Attorney, Agent, or Firm* — Michael Best & Friedrich LLP

(57) ABSTRACT

Systems and methods for controlling a scale. One system includes a first touchless button, a first visual indicator associated with the first touchless button, a second touchless button, coupled to an electronic processor. The electronic processor is configured to receive, from the first touchless button, a first signal indicative of a first gesture. The electronic processor is configured to, in response to receiving the first signal, switch second touchless button from a dormant mode to an active mode and activate the first visual indicator. The electronic processor is configured to receive, from the second touchless button, a second signal indicative of a second gesture. The electronic processor is configured to, in response to receiving the second signal, execute a function of the scale associated with the second touchless button. The electronic processor is configured to switch the second touchless button from the active mode to the dormant mode.

20 Claims, 9 Drawing Sheets

(56) References Cited

U.S. PATENT DOCUMENTS

| | | | |
|---|---|---|---|
| 2010/0133016 A1* | 6/2010 | Mannhart | G01G 7/00 177/25.12 |
| 2014/0326517 A1* | 11/2014 | Gomez | G01G 19/50 177/1 |
| 2016/0007902 A1* | 1/2016 | Hewson | A61B 5/11 600/592 |
| 2016/0161324 A1 | 6/2016 | Tse | |
| 2019/0156394 A1* | 5/2019 | Karmakar | G06Q 30/0631 |

* cited by examiner

SYSTEMS AND METHODS FOR CONTROLLING A SCALE

CROSS-REFERENCE TO RELATED APPLICATION

The present application is related to and claims priority to U.S. Provisional Patent Application Ser. No. 62/807,420, filed Feb. 19, 2019, the entire contents of which are hereby incorporated by reference.

FIELD

The present application relates to systems and methods for controlling scales and, more particularly, controlling the use of touchless buttons for operating a scale, such as a medical scale.

SUMMARY

Scales are used in healthcare environments to measure the weight of a patient. Multiple healthcare personnel may use the same scale to weigh patients throughout the course of a day. The operation of conventional scales requires the healthcare personnel to physically touch one or more buttons on a control panel of the scale. In addition, patients and their clothing, medical devices, and other objects may contact with the control panel, for example, during the weighing process. The repeated touching of the control panel of the scale by different persons and objects may contaminate surfaces of the control panel with pathogens, medicines, chemicals, etc. This can lead to the transmission of disease through indirect contact with the control panel of the scale. To reduce the likelihood of disease transmission by indirect contact, frequently touched surfaces (e.g., scale control panels) should be regularly disinfected.

Sanitizing an area with multiple surfaces, structures, and openings, such as a control panel, can be difficult and time-consuming. Also, due to the construction of the interface (e.g., the structure of the buttons), the sanitizing process and the cleaners used to sanitize can wear or degrade the interface of the scale.

To address these and other independent needs, independent embodiments described herein provide, among other things, scales (for example, medical scales used in a critical care environment) that include touchless control panels, and methods for controlling the same.

One independent embodiment may provide a system for controlling a scale, such as a medical scale. The system may generally include a first touchless button, a first visual indicator associated with the first touchless button, a second touchless button, and an electronic processor. The electronic processor is coupled to the first and second touchless buttons and the first visual indicator. The electronic processor is configured to receive, from the first touchless button, a first signal indicative of a first gesture. The electronic processor is configured to, in response to receiving the first signal, switch second touchless button from a dormant mode to an active mode and activate the first visual indicator. The electronic processor is configured to receive, from the second touchless button, a second signal indicative of a second gesture. The electronic processor is configured to, in response to receiving the second signal, execute a function of the scale associated with the second touchless button. The electronic processor is configured to switch the second touchless button from the active mode to the dormant mode.

Another independent embodiment may provide a method for controlling a scale, such as a medical scale. The method may generally include receiving, by an electronic processor from a first touchless button, a first signal indicative of a first gesture. The method includes, in response to receiving the first signal, switching, with the electronic processor, a second touchless button from a dormant mode to an active mode and activating a first visual indicator. The method includes receiving, from a second touchless button, a second signal indicative of a second gesture. The method includes, in response to receiving the second signal, executing a function associated with the second touchless button. The method includes switching the second touchless button from the active mode to the dormant mode.

Other independent aspects of the invention may become apparent by consideration of the detailed description, claims and accompanying drawings.

DETAILED DESCRIPTION

Figure 1:
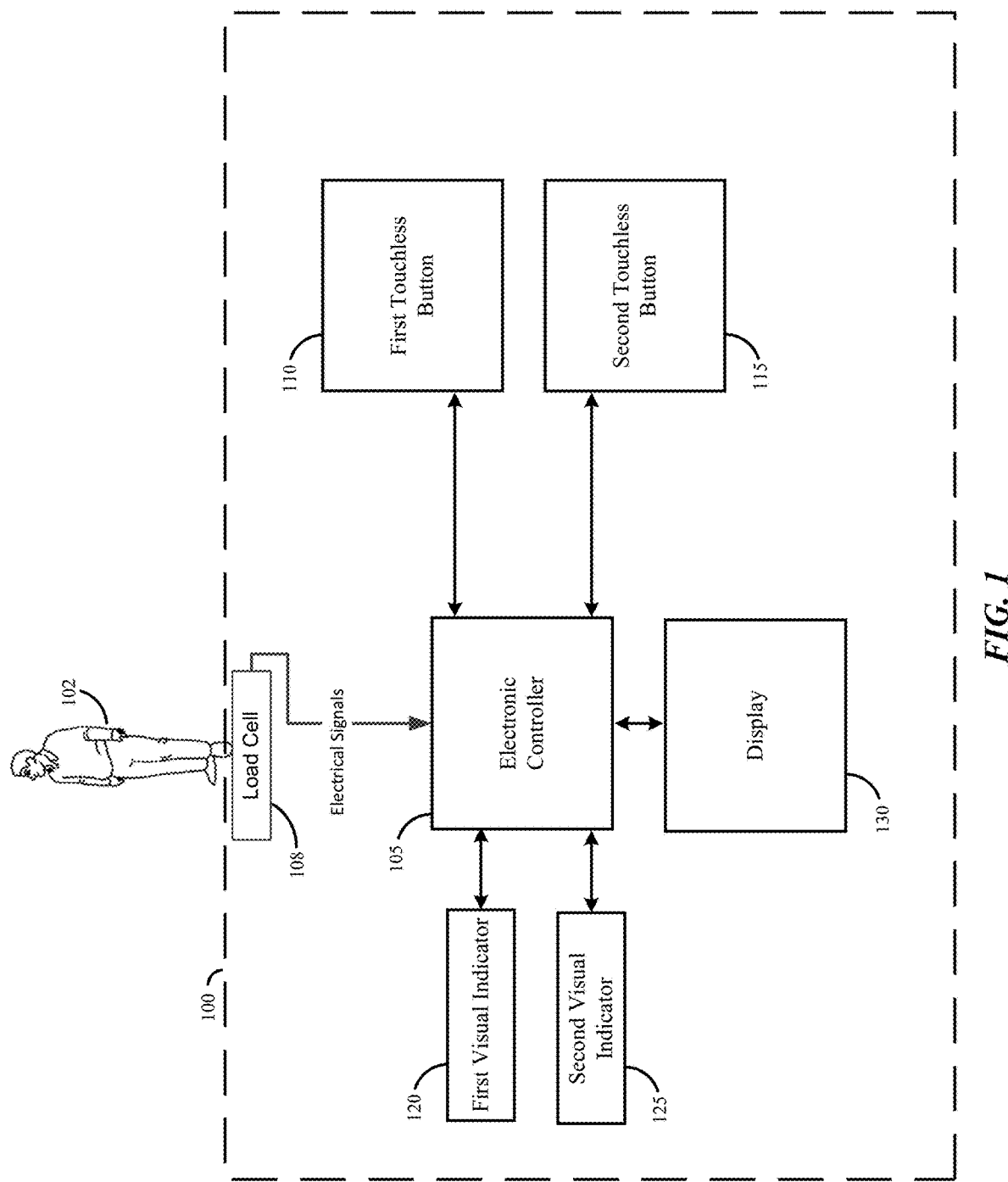
FIG. 1 is a block diagram of a scale, such as a medical scale, according to some independent embodiments.

Before any independent embodiments are explained in detail, it is to be understood that the embodiments presented herein are not limited in their application to the details of construction and the arrangement of components set forth in the following description or illustrated in the following drawings. The independent embodiments presented herein are capable of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. The terms "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 illustrates an exemplary independent embodiment of a scale 100 (for example, a medical scale) used to measure the weight of a patient 102. The scale 100 may include various digital and analog components, which for brevity are not described herein and which may be implemented in hardware, software, or a combination of both. In the example illustrated, the scale 100 includes an electronic controller 105, a load cell 108, a number of touchless buttons (including a first touchless button 110 and a second touchless button 115), a number of visual indicators (including a first visual indicator 120 and a second visual indicator 125), and a display 130.

The illustrated components, along with other various modules and components, are coupled to each other by or through one or more control or data buses that enable communication therebetween. The use of control and data buses for the interconnection between and exchange of information among the various modules and components would be apparent to a person skilled in the art in view of the description provided herein. In some embodiments, wired and wireless network connections between components are possible.

The scale 100 is used to measure the weight of a patient 102. The patient 102 stands or is placed on a platform (not shown), which exerts the force of the weight of the patient 102 on the load cell 108. The illustrated load cell 108 includes a transducer, which produces electrical signals (for example, a voltage) in proportion to a force exerted on it. The controller 105 is configured to process the signals to calculate a weight for the patient 102. In some embodiments, the scale 100 is configured to provide the measured weight to an electronic medical records (EMR) system.

The first touchless button 110 and the second touchless button 115 are part of a control panel for the scale 100. The first touchless button 110 and the second touchless button 115 are configured to be activated without being physically touched. In some embodiments, the touchless buttons 110, 115 are configured to sense gestures occurring within a specific distance of them (for example, within 1-2 centimeters (cm) of the surface of the touchless buttons). A gesture may also be the stationary presence of an object (for example, a fingertip of an operator) near the touchless button 110, 115 for a predetermined period of time. In some embodiments, one or more of the touchless buttons are proximity light and gesture sensors, which sense reflected infrared energy (produced by the sensor) to convert physical motion information (e.g., velocity, direction, and distance) of a sensed object (e.g., the finger of a user) to digital information. In such embodiments, more complex gestures (e.g., swiping right-to-left, left-to-right, up-to-down, down-to-up, in-to-out, out-to-in, and the like) may be sensed. In some embodiments, the touchless buttons are optical sensors and, in such embodiments, the "gesture" may include the presence of a particular object near the touchless button (e.g., the face of a user, an identification badge, etc.).

The period of time is selected to avoid false sensing of gestures as objects move around the touchless button or false selection by an operator who mistakenly places a finger near a touchless button, but pulls the finger away quickly to avoid selecting an errant function. For example, a touchless button may be activated when an operator holds his or her finger over the touchless button for two or more seconds.

A gesture may also be an object that exhibits a particular pattern of motion near the touchless button within a predetermined period of time. For example, a touchless button may be activated by when an operator waves a finger back and forth over the touchless button a number of (e.g., three) times within a predetermined time period (for example, 1 second).

In response to sensing a gesture, the first touchless button 110 and the second touchless button 115 send electrical signals the to the electronic controller 105. The signals are indicative of the sensed gesture. In some embodiments, the touchless buttons 110, 115 are configured to sense the gestures and send signals indicative of the gestures to the electronic controller 105. In some embodiments, the touchless buttons send the electronic controller 105 signals based on what they sense (for example, a first type of gesture or a different, second type of gesture), and the electronic controller 105 interprets the signals to determine whether and what gestures are being sensed.

The first touchless button 110 and the second touchless button 115 are each configured to operate in at least a dormant mode and an active mode. In active mode, the touchless button 110, 115 operates to sense gestures and send signals, as described above. When in dormant mode, the touchless button 110, 115 is "off" and will not sense gestures. As described below, the touchless buttons 110, 115 are in dormant mode by default, to avoid unintended activation and to conserve power (which is important for battery-operated scales).

In some embodiments, the scale 100 includes more than two touchless buttons. For example, in some embodiments (see FIGS. 5-6), the scale 100 includes nine (9) touchless buttons, each with a corresponding visual indicator. In such embodiments, each touchless buttons is associated with a separate scale functions ("ON/OFF", "ZERO/TARE", "CLEAR/REWEIGH", "HOLD/RECALL", units ("LB/KG"), "STORE WGHT", "UP", "DOWN", "ENTER", "CALIBRATE", "OPTION", etc.).

Figure 6:
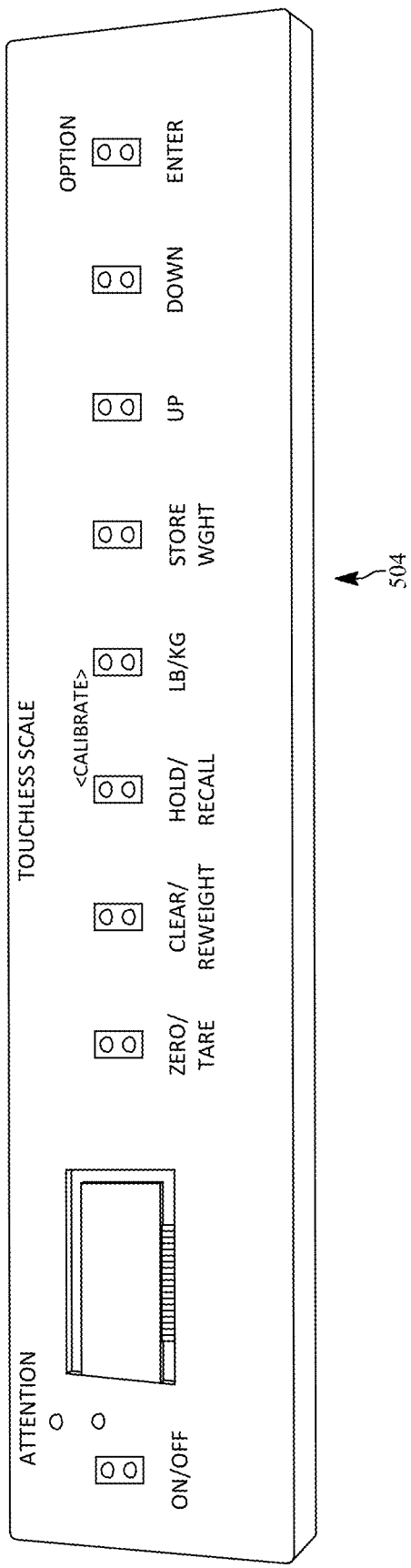
FIG. 6 depicts the control panel of the scale of FIG. 5.
Figure 7:
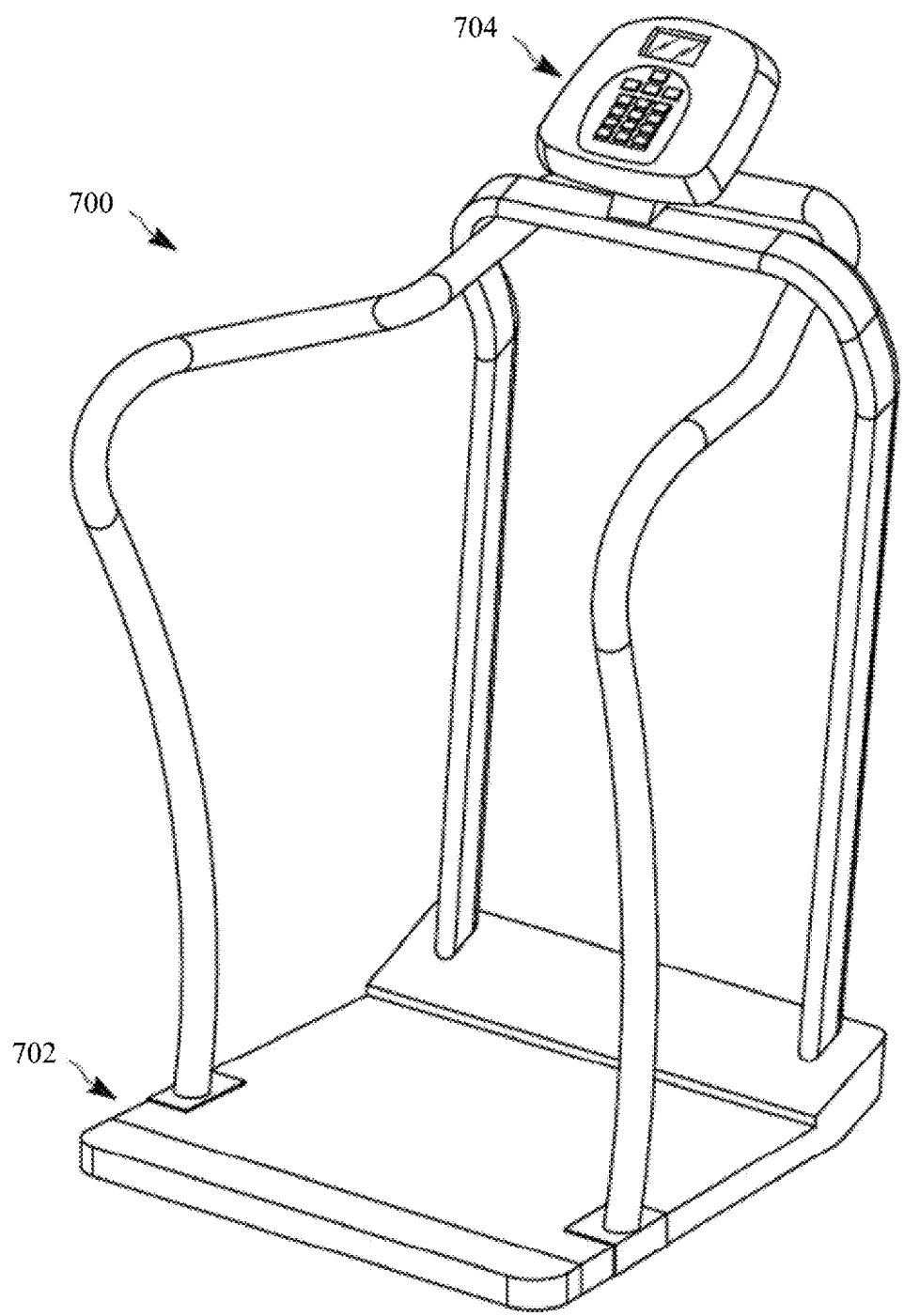
FIG. 7 illustrates another example embodiment of the scale of FIG. 1.

As shown in FIGS. 6-7, each touchless scale button may have a single function (e.g., "ON/OFF", "ZERO/TARE", etc.) or may have more than one function (e.g., "ENTER" and "OPTION"; "HOLD/RECALL"/unit and "CALIBRATE"). Also, more than one touchless button may be used to control a given function (e.g., the "HOLD/RECALL" and units touchless buttons together control the "CALIBRATE" function).

In some embodiments, as described below, one of the touchless buttons remains in active mode (the "ON/OFF" touchless button), and the remaining touchless buttons are switched to active mode when that touchless button is selected. As also described below, such an "active" touchless button may be operated in a sleep mode or an active mode.

The first visual indicator 120 and the second visual indicator 125 provide feedback to an operator of the scale 100. The electronic controller 105 selectively activates the first visual indicator 120 and the second visual indicator 125 to indicate, for example, the status of the associated touchless button 110, 115 or when one or more of the touchless buttons 110, 115 have been selected by an operator.

Some embodiments of the scale 100 include more than two visual indicators. In some embodiments, a visual indicator is provided for each touchless button, with each visual indicator being associated with one touchless button.

In some embodiments, one or more of the visual indicators 120, 125 include light-emitting diodes (LEDs). In some embodiments, a visual indicator is integrated into the associated touchless buttons (see FIG. 3). In some embodiments, the electronic controller 105 provides visual indications using graphical user interface elements (e.g., presented on the display 130).

The display 130 is a suitable display, for example, a liquid crystal display (LCD) screen, an organic light-emitting diode (OLED) screen, etc. In some embodiments, the display 120 is a touch screen display. In some embodiments, the scale 100 implements a graphical user interface (GUI) to present information and feedback to an operator of the scale. For example, the display 120 may show the weight of the patient, indications of functions being selected with the touchless buttons 110, 115, status of the scale 100, etc.

In some embodiments (see FIGS. 5-6), components of the control panel (e.g., the touchless buttons 110, 115, the visual indicators 120, 125, the display 130, etc.) are positioned under an uninterrupted, smooth surface. The illustrated surface is composed of a material that allows for gestures to be detected and visual indications to be seen through the material (e.g., translucent glass or plastic pane). In the illustrated construction, the material of the surface is also resistant to deterioration due to disinfection. Such constructions facilitate effective disinfection of the area of the control panel while reducing wear and damage.

Figure 2:
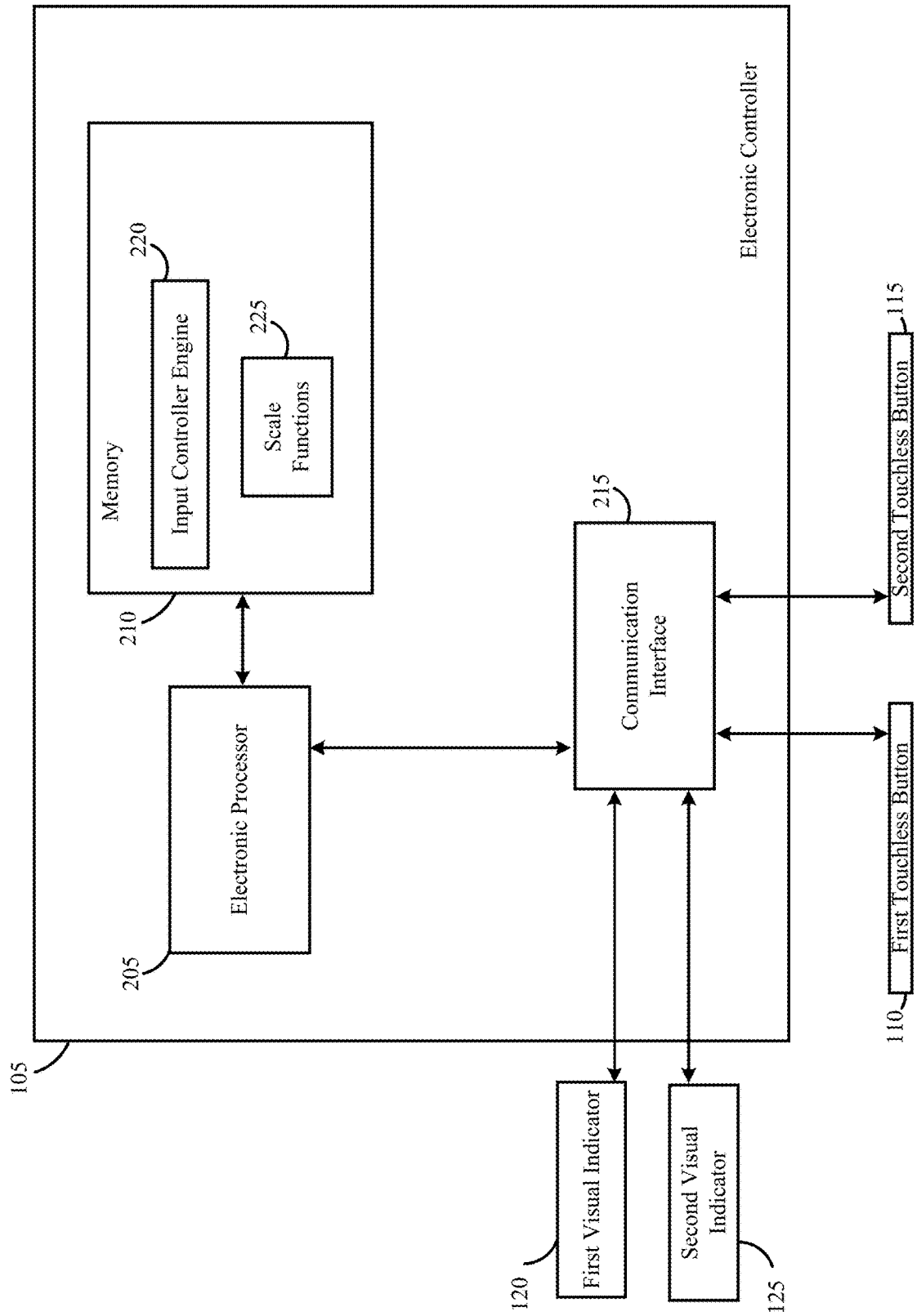
FIG. 2 is a block diagram of an electronic controller of the scale of FIG. 1 according to one embodiment.

FIG. 2 is a block diagram of the electronic controller 105. The electronic controller 105 includes a plurality of electrical and electronic components that provide power, operation control, and protection to the components and modules within the electronic controller 105. The electronic controller 105 includes, among other things, an electronic processor 205 (such as a programmable electronic microprocessor, microcontroller, or similar device), a memory 210, and a first communication interface 215.

The memory 210 is, for example, a non-transitory, machine-readable memory. The first communication interface 215 is communicatively coupled to the first touchless button 110 and second touchless button 115. The electronic processor 205 is communicatively coupled to the memory 210, and the first communication interface 215. In the illustrated embodiment, the memory 210 includes a input controller engine 220 (for example, software or a set of computer-readable instructions that determines functions to be executed in response to the selection of the touchless buttons 110 and 115) and scale functions 225 (for example, software or a set of computer-readable instructions that provide functionality to scales).

The electronic controller 105 may be implemented in several independent controllers each configured to perform specific functions or sub-functions. Additionally, the electronic controller 105 may contain sub-modules that include additional electronic processors, memory, or application specific integrated circuits (ASICs) for handling communication functions, processing of signals, and application of the methods listed below. In other embodiments, the electronic controller 105 includes additional, fewer, or different components.

The first communication interface 215 coordinates the communication of information between the electronic processor 205 and other components of the scale 100 (e.g., the touchless buttons 110, 115). In the example illustrated, information received from the touchless buttons 110, 115 is provided to the electronic processor 205 to assist in determining functions to be executed and visual indicators 120, 125 to be activated when executing the input controller engine 220. The determined functionality is executed with the electronic processor 205 with the software located in the scale functions 225 in memory 210. As further described below, the electronic processor 205 activates a visual indicator corresponding to a touchless button when the touchless button is activated and its corresponding function is executed.

The memory 210 can include one or more non-transitory machine-readable media, and includes a program storage area. The program storage area can include combinations of different types of memory, as described herein. In some embodiments data is stored in a non-volatile random-access memory (NVRAM) of the memory 210. Furthermore, in some embodiments, the memory 210 stores predetermined functions, such as a tare function (e.g., displaying options to a user and executing functionality to allow a user to tare a scale) as well as other functions that are executed to provide a scale functionality, within the program storage area.

Figure 3:
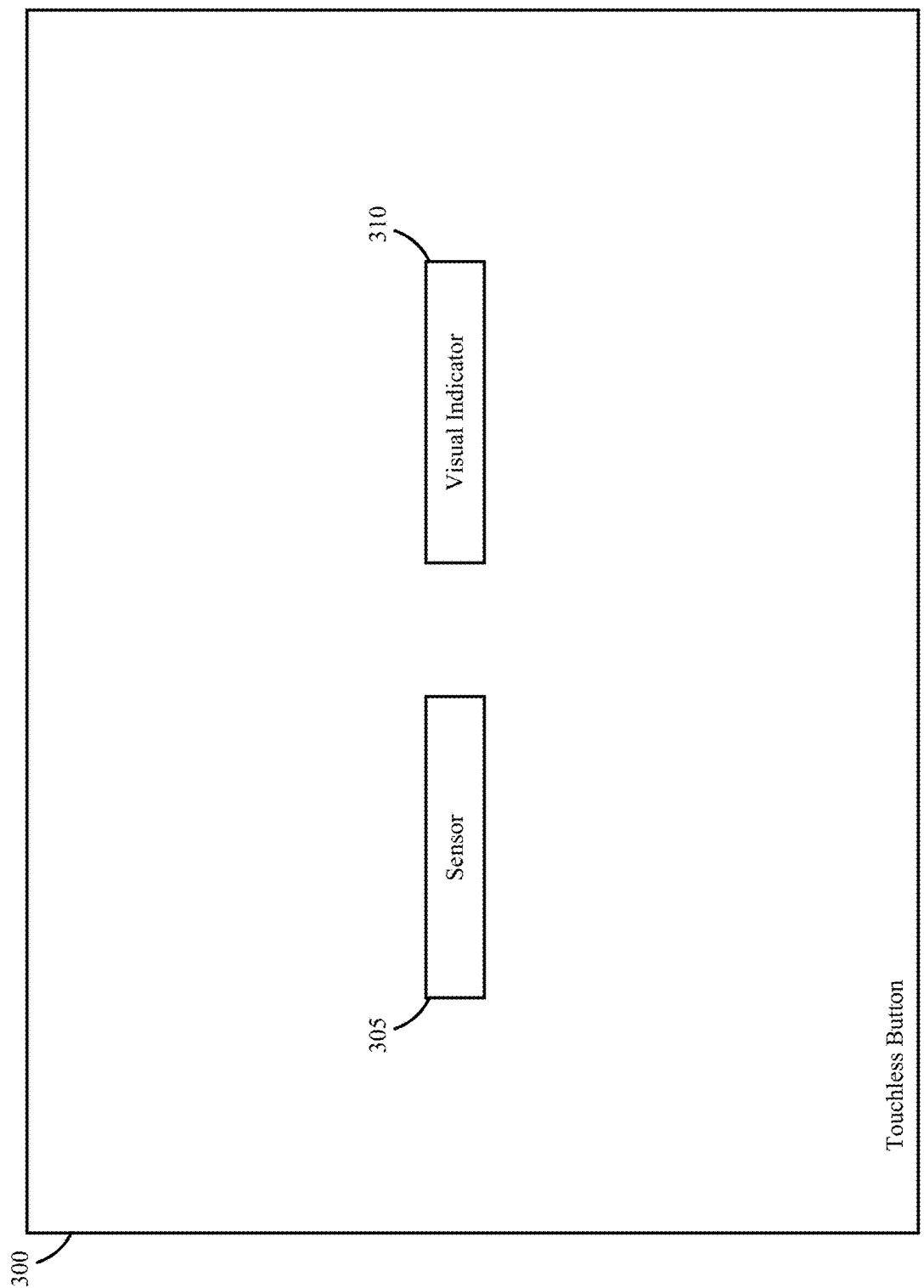
FIG. 3 is a block diagram of an example touchless button of the scale of FIG. 1 according to one embodiment.

FIG. 3 illustrates an example embodiment of a touchless button 300. In the illustrated example, the touchless button 300 includes a sensor 305 and an integrated visual indicator 310. Other embodiments of the touchless buttons lack an integrated visual indicator 310. The sensor 305 is used to sense gestures. In some embodiments, the sensor 305 is an optical sensor. In other embodiments, the sensor 305 may be a capacitive sensor, an infrared sensor, or another suitable sensor configured to operate as described herein.

Figure 4:
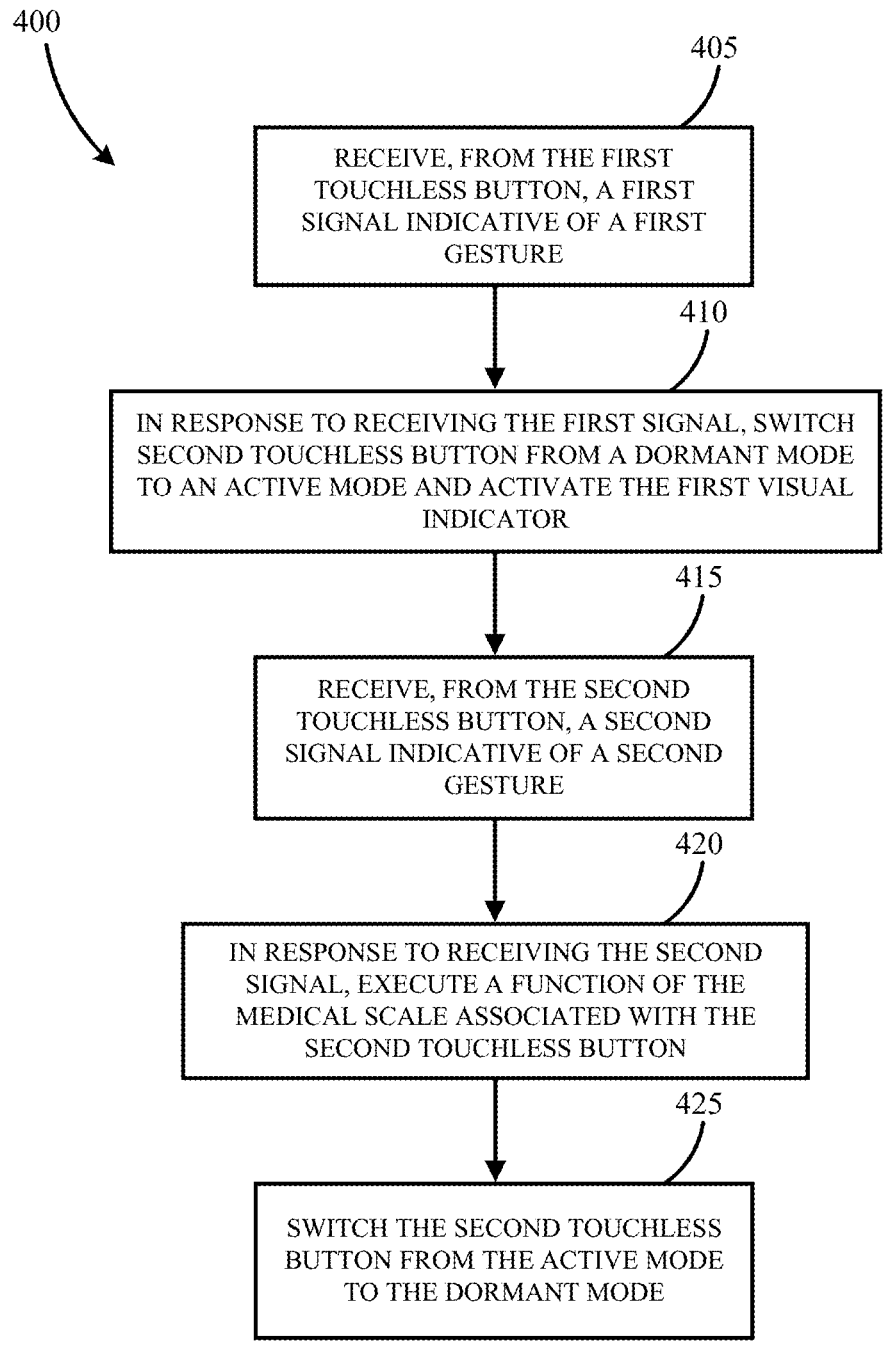
FIG. 4 is a flowchart of a method for controlling the scale of FIG. 1 according to one embodiment.

FIG. 4 illustrates an example method 400 for controlling the scale 100. In some embodiments, the method 400 is performed by the electronic processor 205 and, in particular, the input controller engine 220. At block 405, the electronic processor 205 receives, from the first touchless button 110, a first signal indicative of a first gesture. For example, the first touchless button 110 may sense that an object has been held within a predetermined range of distance from the associated sensor for a predetermined time interval. When this gesture is sensed, the first touchless button 110 sends an electrical signal to the electronic processor 205 indicating the gesture was sensed. In some embodiments, the electrical signal sent to the electronic processor 205 may first need to be interpreted by the electronic processor 205 as the gesture.

In some embodiments, when the scale 100 is powered on, the second touchless button 115 is in dormant mode (i.e., the second touchless button 115 is off and does not sense gestures or send electrical signals to the electronic processor 205). In some embodiments, the dormant mode is the default mode for the second touchless button 115, as well as any other touchless buttons (other than the first touchless button 110) of the scale 100. The second touchless button 115 cannot be selected by an operator until it is switched to an active mode.

At block 410, in response to receiving the first signal, the electronic processor 205 switches the second touchless button 115 from the dormant mode to the active mode. The sensor of the second touchless button 115 is active and able to sense gestures. In some embodiments, in response to receiving the first signal, the electronic processor 205 also activates the first visual indicator 120, indicating to an operator that the second touchless button 115 is active and able to sense gestures. In some embodiments, the electronic processor 205 may produce audio indications (e.g., sounds using a speaker) in place of or in addition to visual indications.

At block 415, the electronic processor 205 receives, from the second touchless button 115, a second signal indicative of a second gesture. For example, the second touchless button 115 may sense a predetermined pattern of movement by a finger of the operator over the touchless button 115 within a predetermined time interval, and send a corresponding electrical signal to the electronic processor 205.

At block 420, in response to receiving the second signal, the electronic processor 205, if necessary, determines the type of gesture and executes a function of the scale 100 associated with the gesture, the second touchless button 115, or both. For example, the second touchless button 115 may be associated with a tare function, which is executed when the second signal is received (indicating a virtual "pressing" or selecting of the touchless button 115). Other available functions may include (see FIGS. 5-6) clear/reweigh, hold/recall, toggling between measurement units (e.g., pounds and kilograms), store weight (e.g., in a memory), functions for navigating a user interface (e.g., up, down, and enter), etc. As mentioned above, in some embodiments, two touchless buttons may be activated simultaneously to perform a function (e.g., entering calibration mode).

In some embodiments, the electronic processor 205 activates the second visual indicator 125 in response to receiving the second signal, to indicate to an operator that the second touchless button 115 has been selection. In such embodiments, the electronic processor 205 deactivates the second visual indicator 125 when the second touchless button 115 is switched from the active mode to the dormant mode.

When the function is executed, the electronic processor, at block 420, switches the second touchless button 115 from the active mode to the dormant mode. This prevents a subsequent accidental selection of the second touchless button 115, and errant execution of its associated function. The second touchless button 115 may then be reactivated using the first touchless button 110, as described above.

Although the method 400 is described in terms of two touchless buttons 110, 115, the method may be used to control scales with more than two touchless buttons. For example, in scales with more than two touchless buttons, the activation of the first touchless button 110 switches all of the remaining touchless buttons, or a subset of the remaining touchless buttons from dormant to active mode. Likewise, in such embodiments, all of the remaining touchless buttons, or a subset of the remaining touchless buttons are switched from active to dormant mode when one of the buttons is selected (senses a gesture). In some embodiments, if no second gesture is detected within a specified timeout period, the electronic processor 205 switches all active touchless buttons from the active mode to the dormant mode.

In some embodiments, the first touchless button 110 acts as a power button for the scale 100. In such embodiments, the first gesture is used to power on the scale 100, and a second gesture and subsequent gestures are used to activate the other touchless buttons of the scale 100.

In some embodiments, the electronic processor 205, is configured to operate in one of a sleep mode and a normal mode. When the scale 100 is powered off, the electronic processor 205 operates in sleep mode and places the first touchless button 110 in a dormant mode. While in the sleep mode, the electronic processor 205 periodically activates the first touchless button 115 to sense the first gesture, and deactivates the first touchless button 115 when a first gesture is not sensed. This mode of operation conserves battery power, while still allowing the operator to power on the scale 100 using a touchless gesture.

Figure 5:
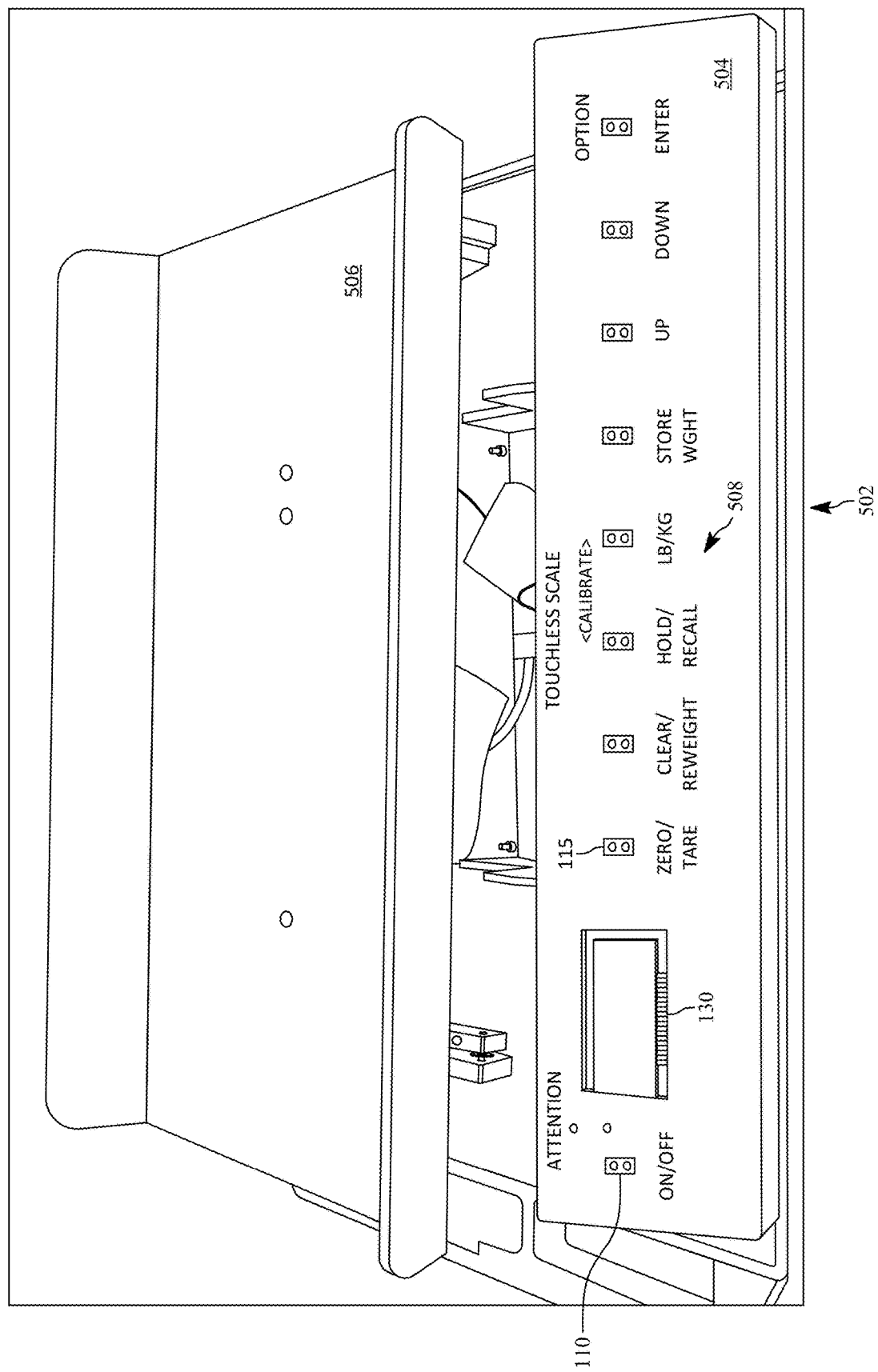
FIG. 5 depicts an example embodiment of the scale of FIG. 1.

FIG. 5 illustrates a construction 502 of the scale 100. The scale 502 includes a control panel 504, and a platform or tray 506. Patients (e.g., infants) are placed in the tray 506 for weighing. Operators of the scale access the functions of the scale 502 using the control panel 504. The control panel 504 includes a plurality of touchless buttons 508, each associated with a function or functions of the scale 502, as illustrated. The first touchless button 110 and the second touchless button 115 are included in the plurality buttons 508. FIG. 6 illustrates a construction of the control panel 504.

FIG. 7 illustrates another construction 700 of the scale 100. The scale 700 includes a platform 702 and a control head 704. Patients are positioned on the platform 702 for weighing. Operators of the scale 100 access the functions of the scale 700 using the control head 704.

Figure 8:
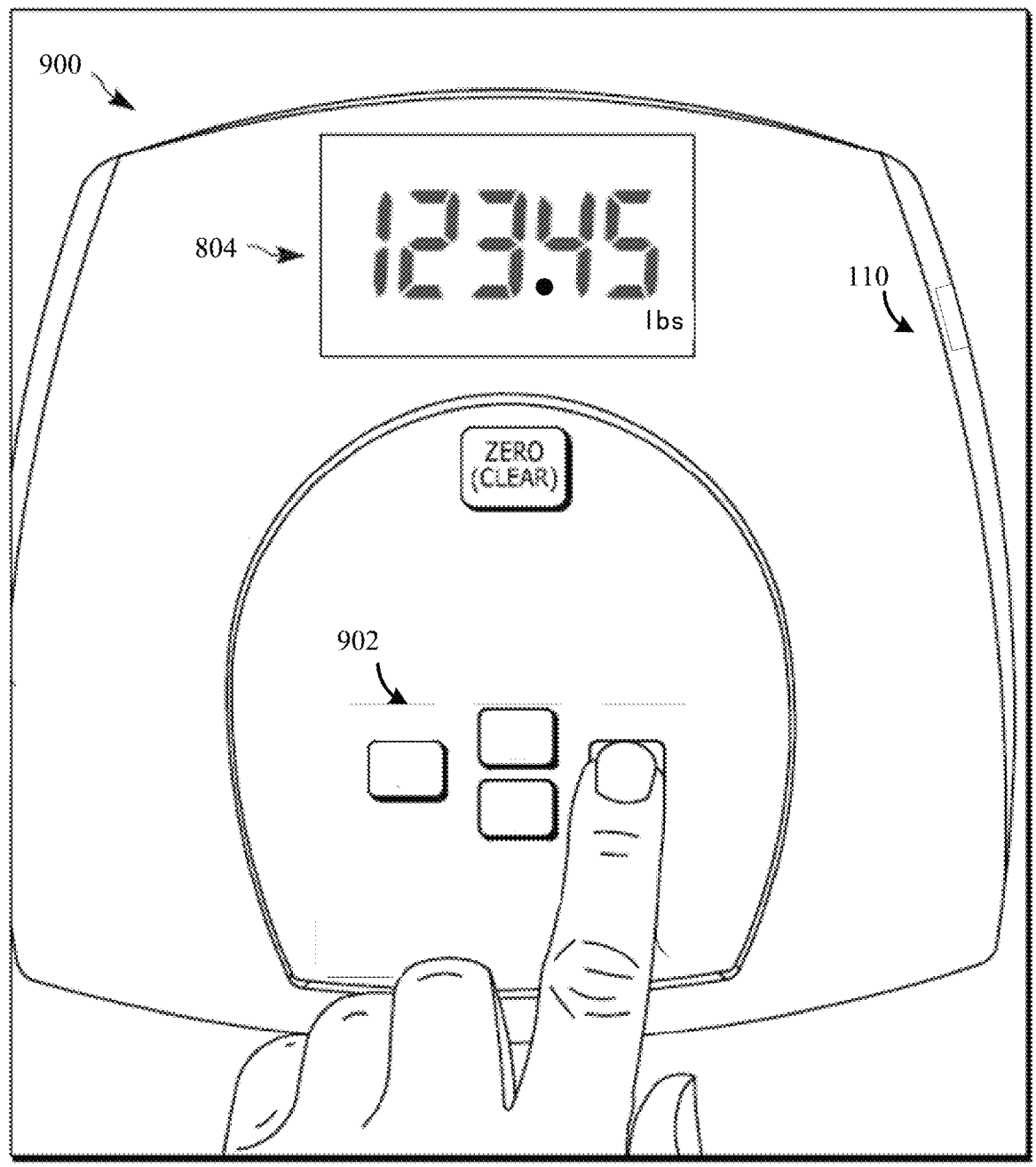
FIG. 8 illustrates a control head of the scale of FIG. 7.

FIG. 8 illustrates an example embodiment of the control head 704. The control head 704 includes a display 804 and a plurality of touchless buttons 806, each of the touchless buttons 806 is associated with a function or functions of the scale 700, as illustrated. The plurality of touchless buttons includes, for example, the first touchless button 110 and the second touchless button 115.

In the illustrated construction, touchless buttons are positioned on different surfaces of the control head 704, for example, due to available space on the main (front) surface of the control head 704. The illustrated control head 704 includes the first touchless button 110, for controlling the "ON/OFF" function, positioned on a side surface. Additional touchless buttons, including the second touchless button 115, are positioned on the main surface. To operate the scale 100, the operator first activates the first touchless button 110 on the side surface before activating a touchless button on the front surface.

In some embodiments (not shown), other touchless buttons may be located on other surfaces of the control head 704 (e.g., the opposite side surface, a top surface, a bottom surface, a rear surface). For example, a touchless button associated with the "CALIBRATE" function may be positioned on the opposite side surface of the control head 704. Also, touchless buttons on the front surface may be arranged (e.g., spaced apart, aligned in a row or column, etc.) to inhibit inadvertent activation of one touchless button during intended activation of another touchless button. The touchless buttons may be positioned on the surfaces of the control head 704 based on, for example, operator work flows, positioning of the scale 100 in a medical facility, etc. As mentioned above, surfaces of the control head 704 may be provided with a unitary, smooth surface of a material suitable for detection of gestures, viewing of visual indicators, disinfection, etc.

Figure 9:
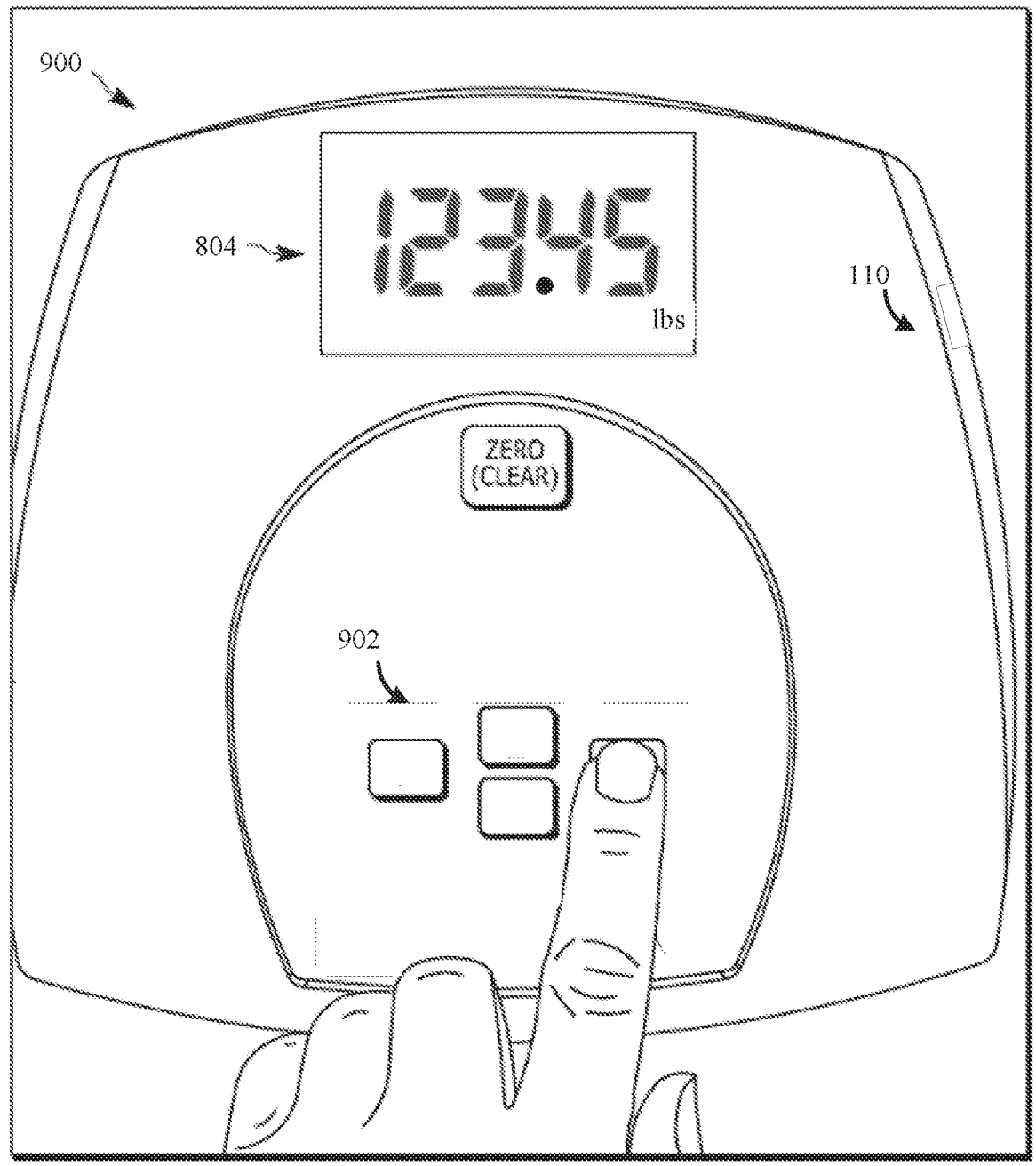
FIG. 9 illustrates a control head of the scale of FIG. 7.

FIG. 9 illustrates another example embodiment of a control head 900 for the scale 700. In the illustrated embodiments, the control head 900 includes a display 804 and a plurality of proximity light and gesture sensors 902. Each of the proximity light and gesture sensors 902 is capable of sensing multiple complex gestures, as described above, and is associated with one or more functions of the scale 700. For example, one light and gesture sensors may set the units of the scale depending on which gesture is sensed (e.g., swiping up to down may select kilograms, while swiping down to up may select pounds). Because each sensor is capable of sensing multiple complex gestures, the control head requires fewer controls to achieve the same level of functionality as, for example, the control head 704 illustrated in FIG. 8. In some embodiments, the control head 704 includes more or fewer light and gesture sensors.

Thus, the invention may provide, among other things, systems and methods for controlling a medical scale through touchless input.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

One or more independent features and/or independent advantages of some embodiments may be set forth in the following claims:

What is claimed is:

1. A system for controlling a scale, the system comprising:
   a first touchless button configured to perform a first function of the scale;
   a visual indicator associated with the first touchless button;
   a second touchless button configured to perform a second function of the scale;
   an electronic processor, coupled to the first touchless button, the second touchless button and the visual indicator, and configured to:
   receive, from the first touchless button, a first signal indicative of a first specific gesture for performing the first function of the scale, wherein the first specific gesture is a physical motion performed within a predetermined period of time by a user in proximity to the first touchless button;
   in response to receiving the first signal, switch the second touchless button from a dormant mode to an active mode and activate the visual indicator;
   receive, from the second touchless button, a second signal indicative of a second specific gesture by the user;
   only in response to receiving the second signal, execute the second function of the scale associated with the second touchless button; and
   responsive to completing execution of the second function, deactivate the visual indicator and switch the second touchless button from the active mode to the dormant mode such that the second touchless button cannot sense further gestures until activated in response to the electronic processor receiving another first signal from the first touchless button.

2. The system of claim 1, wherein the first touchless button and the second touchless button each include one selected from the group consisting of an optical sensor, a capacitive sensor, and an infrared sensor.

3. The system of claim 1, further comprising a second visual indicator associated with the second touchless button and coupled to the electronic processor, wherein the electronic processor is configured to
   activate the second visual indicator in response to receiving the second signal; and
   deactivate the second visual indicator when the second touchless button is switched from the active mode to the dormant mode.

4. The system of claim 1, wherein the visual indicator is one selected from the group consisting of a light-emitting diode and a graphical user interface element on a display.

5. The system of claim 1, further comprising a speaker coupled to the electronic processor, wherein the electronic processor is configured to
   activate the speaker to produce a first sound in response to receiving the first signal; and
   activate the speaker to produce a second sound in response to receiving the second signal.

6. The system of claim 1, wherein the electronic processor is configured to
   operate in one of a sleep mode and a normal mode; and
   while operating in the sleep mode, periodically activate the first touchless button to sense the first gesture and deactivate the first touchless button when the first gesture is not sensed.

7. The system of claim 6, wherein the electronic processor is configured to, in response to sensing the first specific gesture, switch from the sleep mode to the normal mode.

8. The system of claim 1, wherein the second function is one selected from the group consisting of tare, clear, reweigh, hold, recall, toggle units, store weight, calibrate, and an interface navigation function.

9. The system of claim 1, further comprising:
   a third touchless button configured to perform a third function of the scale; and
   a third visual indicator associated with the third touchless button;
   wherein the electronic processor is configured to
   receive, from the first touchless button, a third signal indicative of the first specific gesture;
   in response to receiving the third signal, switch the third touchless button from a dormant mode to an active mode and activate the visual indicator;
   receive, from the third touchless button, a fourth signal indicative of a third specific gesture;
   in response to receiving the fourth signal, execute a third function of the scale associated with the third touchless button; and
   responsive to completing execution of the third function, switch the third touchless button from the active mode to the dormant mode.

10. A method for controlling a scale, the method comprising:
    receiving, by an electronic processor from a first touchless button configured to perform a first function of the scale, a first signal indicative of a first specific gesture for performing the first function of the scale, wherein the first specific gesture is a physical motion performed within a predetermined period of time by a user in proximity to the first touchless button;
    in response to receiving the first signal, switching, with the electronic processor, a second touchless button configured to perform a second function of the scale from a dormant mode to an active mode and activating a visual indicator;

receiving, from the second touchless button, a second signal indicative of a second specific gesture by the user;

only in response to receiving the second signal, executing the second function associated with the second touchless button; and responsive to completing execution of the second function, deactivating the visual indicator and switching the second touchless button from the active mode to the dormant mode such that the second touchless button cannot sense further gestures until activated in response to the electronic processor receiving another first signal from the first touchless button.

11. The method of claim 10, wherein receiving the first signal indicative of the first specific gesture includes receiving the first signal from one selected from the group consisting of an optical sensor, a capacitive sensor, and an infrared sensor.

12. The method of claim 10, wherein activating the visual indicator includes activating one selected from the group consisting of a light-emitting diode and a graphical user interface element on a display.

13. The method of claim 10, further comprising:
activating a second visual indicator in response to receiving the second signal; and
deactivating the second visual indicator when the second touchless button is switched from the active mode to the dormant mode.

14. The method of claim 10, further comprising:
activating a speaker to produce a first sound in response to receiving the first signal; and
activating the speaker to produce a second sound in response to receiving the second signal.

15. The method of claim 10, wherein executing the second function includes executing one selected from the group consisting of tare, clear, reweigh, hold, recall, toggle units, store weight, calibrate, and an interface navigation function.

16. The method of claim 10, further comprising:
receiving, from the first touchless button, a third signal indicative of the first specific gesture;
in response to receiving the third signal, switching a third touchless button from a dormant mode to an active mode and activating the visual indicator;
receiving, from a third touchless button, a fourth signal indicative of a third specific gesture;
in response to receiving the fourth signal, executing a third function of the scale associated with the third touchless button; and
responsive to completing execution of the third function, switching the third touchless button from the active mode to the dormant mode.

17. A control head for a scale, the control head comprising:
a housing;
a first touchless button disposed on the housing, configured to perform a first function of the scale and operable to sense a first specific gesture;
a first visual indicator associated with the first touchless button;
a second touchless button disposed on the housing, configured to perform a second function of the scale and operable to sense a second specific gesture;
a second visual indicator associated with the second touchless button;
a material covering the first touchless button, the second touchless button, the first visual indicator, and the second visual indicator, the first touchless button and the second touchless button being operable to sense respective gestures through the material, the first visual indicator and the second visual indicator being visible through the material, the material being resistant to disinfectant; and
an electronic processor, coupled to the first touchless button, the second touchless button, the first visual indicator, and the second visual indicator, and configured to
receive, from the first touchless button, a first signal indicative of the first specific gesture for performing the first function of the scale, wherein the first specific gesture is a physical motion performed within a predetermined period of time by a user in proximity to the first touchless button;
in response to receiving the first signal, switch the second touchless button from a dormant mode to an active mode and activate the visual indicator;
receive, from the second touchless button, a second signal indicative of the second gesture;
only in response to receiving the second signal, execute the second function of the scale associated with the second touchless button and activate the second visual indicator; and
responsive to completing execution of the second function, switch the second touchless button from the active mode to the dormant mode and deactivate the second visual indicator such that the second touchless button cannot sense further gestures until activated in response to the electronic processor receiving another first signal from the first touchless button.

18. The control head of claim 17, wherein the housing includes a first surface and a second surface oriented at an angle relative to the first surface, and wherein the first touchless button is positioned on the first surface, and the second touchless button is positioned on the second surface.

19. The control head of claim 17, wherein the first touchless button and the second touchless button each include one selected from the group consisting of an optical sensor, a capacitive sensor, and an infrared sensor.

20. The control head of claim 17, wherein the second function is one selected from the group consisting of tare, clear, reweigh, hold, recall, toggle units, store weight, calibrate, and an interface navigation function.

* * * * *